United States Patent [19]

Serrand

[11] Patent Number: 5,365,006
[45] Date of Patent: Nov. 15, 1994

[54] PROCESS AND APPARATUS FOR DEHYDROGENATING ALKANES

[75] Inventor: Willibald Serrand, Buxheim, Germany

[73] Assignee: Exxon Research and Engineering Company, Florham Park, N.J.

[21] Appl. No.: 962,797
[22] PCT Filed: Jun. 25, 1991
[86] PCT No.: PCT/GB91/01028
 § 371 Date: Dec. 31, 1992
 § 102(e) Date: Dec. 31, 1992
[87] PCT Pub. No.: WO92/00139
 PCT Pub. Date: Jan. 9, 1992

[30] Foreign Application Priority Data
 Jul. 2, 1990 [GB] United Kingdom ............... 9014643.2

[51] Int. Cl.$^5$ .................... C07C 2/00; C07C 5/327; C07C 5/373
[52] U.S. Cl. .................... 585/501; 585/500; 585/654; 585/658; 585/659; 585/310; 585/312; 585/324; 585/910; 585/911; 422/139; 422/140; 422/144; 502/38; 502/41; 502/44
[58] Field of Search ................... 422/139, 140, 144; 502/38, 41, 44; 585/324, 500, 501, 312, 654, 658, 659, 910, 911, 310

[56] References Cited

U.S. PATENT DOCUMENTS 2,304,183 12/1942 Layng et al. .
2,377,935 6/1945 Gunness .

(List continued on next page.)

FOREIGN PATENT DOCUMENTS

| | | |
|---|---|---|
| 0023402 | 2/1981 | European Pat. Off. . |
| 0130251 | 1/1985 | European Pat. Off. . |
| 0154674 | 9/1985 | European Pat. Off. . |
| 0179321 | 4/1986 | European Pat. Off. . |
| 0295018 | 12/1988 | European Pat. Off. . |
| 0325437 | 7/1989 | European Pat. Off. . |
| 0325438 | 7/1989 | European Pat. Off. . |
| 0330304 | 8/1989 | European Pat. Off. . |
| 0419639 | 10/1990 | European Pat. Off. . |
| 0431732 | 6/1991 | European Pat. Off. . |
| 1398802 | 6/1975 | United Kingdom . |
| 2100747 | 1/1983 | United Kingdom . |
| 2104094 | 3/1983 | United Kingdom . |
| WO9011338 | 10/1990 | WIPO . |

OTHER PUBLICATIONS

Chem. Eng. Progress, Jul. 1985, pp. 33/40.
Oil and Gas Journal, Sep. 16, 1985 pp. 87/92.

*Primary Examiner*—Anthony McFarlane
*Assistant Examiner*—E. D. Irzinski
*Attorney, Agent, or Firm*—Roy J. Ott

[57] ABSTRACT

An alkane-containing feedstream is passed through one or more tubes, which may contain alkane-dehydrogenation catalyst, immersed in a bed of fluidized particles. The bed is at an elevated temperature which maintains the temperature within the tube(s) at an alkane-dehydrogenation temperature. The particles may be inert, chemically active and/or catalytically active. In one embodiment, cracking catalyst particles are circulated between a reaction zone wherein they contact a cracker feedstock which is converted to cracked hydrocarbon products and a regenerator (22) wherein carbonaceous deposits on the catalyst particles are exothermically removed by contact with an oxygen-containing gas (24). Hot regenerated particles from the regenerator (22) are recirculated (27) to the reaction zone for re-use therein. At least some of the circulating cracking catalyst (33) is passed in indirect heat-exchange relationship (42) with an alkane-containing feedstream (44) within a tube (42) whereby alkanes are endothermically dehydrogenated to olefins and the cracking catalyst is cooled. Tube (42) contains a dehydrogenation catalyst, and the latter may be circulated between an alkane-dehydrogenation zone (42) and a catalyst re-activation zone (61). In the latter zone, carbonaceous deposits are exothermically removed by an oxygen-containing gas.

12 Claims, 4 Drawing Sheets

U.S. PATENT DOCUMENTS

| | | |
|---|---|---|
| 2,397,352 | 3/1946 | Hemminger . |
| 2,412,025 | 12/1946 | Zimmerman . |
| 2,459,836 | 1/1949 | Murphree . |
| 3,714,024 | 1/1973 | Youngblood et al. . |
| 3,856,659 | 12/1974 | Owen . |
| 3,894,935 | 7/1975 | Owen . |
| 4,116,814 | 9/1978 | Zahner . |
| 4,422,925 | 12/1983 | Williams et al. . |
| 4,513,162 | 4/1985 | Al-Muddarris . |
| 4,542,247 | 9/1985 | Chang et al. . |
| 4,547,616 | 10/1985 | Forbus . |
| 4,702,818 | 10/1987 | Oyamoto et al. . |
| 4,720,602 | 1/1988 | Chu . |
| 4,746,762 | 5/1988 | Avidan et al. . |
| 4,789,457 | 12/1988 | Fischer et al. . |
| 4,840,928 | 6/1989 | Harandi et al. . |
| 4,859,308 | 8/1989 | Harandi et al. . |
| 4,869,807 | 9/1989 | Krishna . |
| 4,871,699 | 10/1989 | Fahrig et al. . |
| 4,874,503 | 10/1989 | Herbst et al. . |
| 4,956,509 | 9/1990 | Harandi et al. . |
| 5,009,851 | 4/1991 | Avidan et al. . |

PROCESS AND APPARATUS FOR DEHYDROGENATING ALKANES

FIELD OF THE INVENTION

The present invention relates to a process and an apparatus for dehydrogenating alkanes. The invention also relates to an integrated combination process for the simultaneous production of olefins and catalytically cracked hydrocarbons, and to apparatus for performing the process.

BACKGROUND OF THE INVENTION

Olefins are produced by the thermal and/or catalytic dehydrogenation of alkanes. In the thermal cracking processes, alkanes are passed through tubes which are maintained at a temperature which is sufficiently high to cause dehydrogenation of alkanes to alkenes. A by-product of thermal cracking is "coke", which is a material of high carbon to hydrogen atomic ratio. The coke forms a deposit which reduces heat transfer from outside the tubes to the alkane stream passing through the interior of the tubes. A common expedient to reduce coke deposition is to pass steam through the tubes with the alkane stream. The steam reduces the vapour pressure of the alkanes and tends to reduce polymerization side-reactions involved in the formation of coke. Processes wherein alkanes are dehydrogenated to alkenes in the presence of steam are known as steam cracking processes, and are widely used in the chemical industry for the manufacture of ethene and propene, inter alia.

PRIOR ART

GB-A-2104094 describes a steam cracking process wherein a feed mixture containing alkane and steam is passed through reaction tubes from a feed header, and a product mixture containing steam, unconverted alkane and alkenes is recovered from the reaction tubes in a product header. The reaction tubes contain a specified dehydrogenation catalyst, and the feed mixture is passed through some of the total available tubes, the other tubes receiving a mixture containing steam and air which remove carbonaceous deposits therefrom. The pressure in the operative tubes is in the range of from 2 to 25 atmospheres (0.203 to 2.534 MPa) and the temperature in the tubes is in the range of from 450° to 700° C., preferably 500° to 650° C. The tubes are heated by burning fuel in a fuel-combustion zone from which high temperature radiant, convective and conductive heat-transfer to the exteriors of the tubes is effected. After passing across the exteriors of the tubes, the combustion gases have considerable enthalpy, and some is recovered in superheated-steam generation equipment, some is recovered in saturated-steam generation equipment, and some is recovered in air-preheaters. A portion of the superheated steam is used as the process-steam in the steam-cracking operation. There is no disclosure regarding usage of the remaining steam, and it is conceivable that at least some of it would be surplus to the requirement at the plant site. Moreover, much of the heat is lost in the combustion gas discharged to atmosphere. Thus, a steam-cracking plant of the type described in GB-A-2104094 is likely to be thermally inefficient in terms of the energy consumed to olefin-production. Fuel must be burned to maintain the high temperatures essential for the dehydrogenation reactions, but much of the heat value of the fuel is either not utilized or is not efficiently utilized.

In the fluidized catalytic cracking (FCC) of a cracker feedstock, the cracker feedstock is brought into contact with hot particles of active cracking catalyst in a reaction zone. During this period of contact, the feedstock is converted to lower molecular weight hydrocarbons and hydrogen and higher molecular weight by-products. The former include hydrocarbon distillates and hydrocarbon gases which are recovered from the reaction zone after separation from catalyst. The latter include materials of relatively high carbon to hydrogen ratio which are associated with the catalyst. The catalyst particles and associated material are subjected to the action of a stripping gas (usually steam) to remove strippable materials, and the latter are recovered with the lower molecular weight products. The stripped catalyst has associated therewith unstripped material (termed "coke") of high carbon:hydrogen ratio, and is passed to a regeneration zone wherein it is contacted with an oxygen-containing gas (e.g., air) which burns coke from the catalyst particles, thereby raising its temperature and regenerating catalyst is activity. The thus-heated and regenerated catalyst is circulated to the reaction zone for use in catalytically cracking further quantities of feedstock. The heat generated by the exothermic catalyst regeneration step in the regeneration zone is thus employed for the endothermic cracking step in the reaction zone. The principal object of catalytic cracking is to convert cracker feedstocks to high value products such as gasoline, diesel fuel and aviation fuel. The low molecular weight hydrocarbons and hydrogen products are of relatively lower value, although some can be used for alkylation if an alkylation facility is available. The alkane products are of relatively low value since they can generally be sold only for fuel unless they can be employed as feedstock to a dehydrogenation unit of the type described supra.

The cost of cracker feedstocks tends to reflect attributes such as their Conradson carbon number and their contents of metals and sulfur. The higher each of the foregoing attributes is, the lower tends to be the cost of the cracker feedstock. During the catalytic cracking of a low-cost cracker feedstock, the amount of coke deposited on the catalytic particles tends to exceed the amount required to produce heat, on oxidation, to maintain the temperature in the reaction zone. An excess of coke can be an embarrassment to the operation of a catalytic cracker since a blower to supply air to the regeneration zone when a low Conradson carbon feed is processed may be of inadequate capacity in relation to operations using a cheaper high Conradson carbon feed. Moreover, the excess heat produced during catalyst regeneration must be disposed of in some way. Usually, excess heat (i.e., heat in excess of that required for the endothermic reactions in the reaction zone) is used to raise steam for process operations or for auxiliary uses. The amount of available high-level (i.e. high temperature) heat which can be employed for steam raising is relatively small, and most steam raised is from low-level (i.e. lower temperature heat) to produce steam at manageable pressures. The amount of heat from catalyst regeneration often exceeds the total heat requirement of the catalytic cracking unit and other equipment, and may need to be dissipated to the environment (e.g., to the atmosphere and/or a river and/or the sea), which is generally undesirable from the point of view of preserving the environment.

U.S. Pat. No. 2,377,935 describes a fluidized catalytic cracking unit (FCCU). The operation of the FCCU produces gas oils, naphthas and light gases (inter alia), as is conventional. The regenerator of the FCCU is connected to an external cooler for control of the temperature in the regenerator. The external cooler comprises a vessel containing conduits for the passage therethrough of a cooling fluid. The vessel is connected to receive catalyst from an upper region of the regenerator and to return catalyst to a lower region of the regenerator after passing in contact with the exterior surfaces of the conduits for the cooling fluid which circulates within the tubes. The nature of the cooling fluid is not specified, but the document states (at page 5, right-hand column, lines 15 to 17) that the heat abstracted from catalyst in the cooler "may be utilized for generating steam or for any other purpose". There is no disclosure or suggestion that the FCCU operations might be modified to yield different products.

EP-A-325437, EP-A-325438 and EP-A-330304 describe FCCUs which have features in common with each other in that a discrete fluidized bed catalyst cooler vessel is connected to receive hot catalyst from an upper region of a dense-phase fluidized bed in the regenerator vessel. The catalyst in the catalyst cooler is fluidized by an upwardly-passing stream of $C_2$–$C_6$ alkane-containing feed, which contains propane, but which may also contain butanes and ethane. The alkanes are endothermically dehydrogenated to alkenes, which are recovered from the top of the cooler. The cooled catalyst is returned to the regenerator, and in some embodiments may be circulated to the reactor and/or stripper in addition. An essential feature of the process described in all these three documents is that the catalyst must be a large pore crystalline zeolite which preferably contains active dehydrogenation promoters, such as nickel and vanadium. Large pore crystalline zeolite materials are not conventionally used for the dehydrogenation of alkanes, and they may not be as efficient for this purpose as conventional dehydrogenation catalysts comprising a chromium and/or zinc component on an alumina and/or silica support. Although a zeolitic cracking catalyst containing active dehydrogenation promoters may be suitable for effecting the alkane-dehydrogenation reactions as described in these documents, it is well-known in the art that dehydrogenation-promoting metals, particularly nickel and vanadium (inter alia) are highly undesirable with regard to the catalytic cracking reactions desired in the reactor of an FCCU, and steps are often taken to avoid contamination of the cracking catalyst with such metals and/or to passivate their dehydrogenation activity. Moreover, the use of an alkane dehydrogenation reaction to cool hot regenerated catalyst by direct heat exchange between the latter and the alkane feed imposes constraints on the operation of the FCCU since the rate of alkane feed to the catalyst cooler must match the carbon supply to the FCCU regenerator in order that the latter cooler can effectively regulate the temperature of catalyst undergoing regeneration in the regenerator.

SUMMARY OF THE INVENTION

The present invention provides a process for dehydrogenating alkanes comprising passing an alkane-containing feedstream through a dehydrogenation zone comprising one or more heat exchange tubes (which may contain alkane-dehydrogenation catalyst), which tubes are immersed in a bed of fluidized particles at an elevated temperature, the temperature within the heat exchange tube(s) being maintained in the alkane dehydrogenation temperature range by heat-transfer from the fluidized bed, and recovering an olefin-containing product stream from the dehydrogenation zone.

The present invention also provides an integrated combination process for the simultaneous production of olefins and catalytically cracked hydrocarbon products (CCHP) employing the alkane-dehydrogenation process described, comprising the steps of passing a hydrocarbon feedstock to the reaction zone of a catalytic cracking unit (CCU) wherein the feedstock is contacted with active cracking catalyst under catalytic cracking conditions and converted to CCHP and the cracking catalyst is at least palatially deactivated by coke and hydrocarbonaceous material deposited thereon, separating the CCHP and deactivated cracking catalyst, recovering the CCHP, subjecting the deactivated cracking catalyst to a stripping step in a stripping zone to remove at least some of the hydrocarbonaceous material therefrom, subjecting the stripped, deactivated catalyst to a regeneration step in a regeneration zone wherein at least some of the coke and remaining hydrocarbonaceous material is removed by exothermic oxidation which raises the catalyst temperature, passing regenerated and heated catalyst from the regeneration zone to the reaction zone for the catalytic cracking of further quantities of hydrocarbon feedstock, and employing particles of cracking catalyst circulating in the CCU as the particles of the said fluidized bed of the dehydrogenation zone by passing through the fluidized bed cracking catalyst particles passing to and/or from the regenerator.

In another aspect, the present invention provides an integrated combination process for the simultaneous production of olefins and catalytically cracked hydrocarbon products (CCHP) comprising the steps of passing a hydrocarbon feedstock to the reaction zone of a catalytic cracking unit (CCU) wherein the feedstock is contacted with active cracking catalyst under catalytic cracking conditions and convened to CCHP, and the cracking catalyst is at least partially deactivated by coke and hydrocarbonaceous material deposited thereon, separating the CCHP and deactivated cracking catalyst, recovering the CCHP, subjecting the deactivated cracking catalyst to a stripping step in a stripping zone to remove at least some of the hydrocarbonaceous material therefrom, subjecting the stripped, deactivated catalyst to a regeneration step in a regeneration zone wherein at least some of the coke and remaining hydrocarbonaceous material is removed by exothermic oxidation which raises the catalyst temperature, passing regenerated and heated catalyst from the regeneration zone to the reaction zone for the catalytic cracking of further quantities of hydrocarbon feedstock, passing a feedstream containing alkanes into a dehydrogenation zone (which may contain a dehydrogenation catalyst), maintaining the temperature in the dehydrogenation zone within the range for catalytic dehydrogenation of alkanes to alkenes by indirect heat exchange with cracking catalyst passing to and/or from the regeneration zone, and recovering an olefin-containing stream from the dehydrogenation zone.

Preferably, the dehydrogenation zone comprises a plurality of tubes (which may contain dehydrogenation catalyst) and which tubes are surrounded by hot cracking catalyst.

The passage of the feedstream through each tube of the dehydrogenation zone may be interrupted periodically, and an oxygen-containing gas (e.g. air) may be passed into each tube during the said interruption and employed to remove carbonaceous deposits from the interior of the tube (and from any dehydrogenation catalyst therein). Gas recovered from each tube during each interruption may be passed into the regeneration zone. Preferably, a substantially oxygen-free non-combustible purge gas is passed through each tube to remove oxygen before the passage of the feedstream through the tubes is resumed after interruption.

In another type of embodiment, particles of dehydrogenation catalyst are circulated through the tube(s) in contact with the feedstream. Catalyst particles are separately recovered from dehydrogenated alkanes and contacted with an oxygen-containing gas to remove carbonaceous deposits therefrom by exothermic oxidation thereof, and the thus re-activated and heated dehydrogenation catalyst particles are recirculated to the tube(s) for contact with further quantities of the alkane-containing feedstream. Preferably, the catalyst particles and feedstream pass through the tube(s) countercurrently, and an olefin-containing product stream is recovered from one end of the tube(s) and deactivated catalyst is recovered from the other end of the tube(s). Preferably, deactivated catalyst is entrained with the oxygen-containing gas, and after separation of reactivated catalyst, spent oxygen-containing gas is circulated to the said regeneration zone and/or to a CO-boiler (and/or other safe disposal means).

Preferably, the cracking catalyst surrounding the said tubes is maintained in a fluidized state. The cracking catalyst may be maintained in a fluidized state by passing into the cracking catalyst an oxygen-containing fluidizing gas.

Preferably, the fluidizing gas, after passing through fluidized cracking catalyst surrounding the said tubes, is conducted into contact with cracking catalyst undergoing regeneration. Preferably, cracking catalyst is passed in contact with the exterior of the tubes of the dehydrogenation zone and is thereafter passed, at least in part, to the regeneration zone and/or the stripping zone and/or the reaction zone.

Preferably, the temperature within the tubes of the dehydrogenation zone is maintained in the range of from 500° to 800° C., more preferably from 600° to 750° C. The gauge pressure within the tubes of the dehydrogenation zone may be maintained in the range of from 0 to 400 kPa, preferably from 70 to 250 kPa.

Each tube of the dehydrogenation zone may comprise a first part for conducting feedstream upwards, a second part for conducting feedstream downwards and a connecting part for conducting feedstream from the first part to the second part. However, other tube configurations and/or arrangements of the dehydrogenation zone (e.g., such as a tube-in-tube bayonet-type heat exchanger) may be appropriate or convenient.

In another aspect, the invention provides apparatus for performing the said alkane-dehydrogenation process described herein comprising one or more tubes adapted for connection to a source of an alkane-containing feedstream (and which tube(s) may contain alkane-dehydrogenation catalyst) immersed in a fluidized or fluidizable bed of particles or a circulating fluidized bed, and means operable to maintain the particles in a hot fluidized state. The particles may comprise chemically active components (e.g., CaO) to fix environmental pollutants (e.g., $SO_x$) from fuel burned to maintain the bed temperature. There may be means for (partially or completely) burning the fuel in the bed and/or in gas passed to the bed. There may be means for supplying a fluidizing gas to the bottom of the bed.

In another aspect, the present invention provides apparatus suitable for performing the aforesaid process, the apparatus comprising a reactor wherein a feedstock is contacted with active cracking catalyst under catalytic cracking conditions and converted to catalytically cracked hydrocarbon products (CCHP) and the cracking catalyst is at least partially deactivated by coke and hydrocarbonaceous material deposited thereon, a separator for separating CCHP from deactivated cracking catalyst, a stripper which receives deactivated cracking catalyst from the separator and wherein the deactivated catalyst is subjected to stripping to remove at least some of the hydrocarbonaceous material therefrom, a regenerator connected for receiving stripped catalyst from the stripper and wherein at least some of the coke and remaining hydrocarbonaceous material is removed from catalyst by exothermic oxidation which raises the temperature of the catalyst from the stripper temperature to the regeneration temperature, a conduit for the passage of hot regenerated catalyst from the regenerator to the reactor, and a catalyst cooler connected for receiving hot catalyst passing to and/or from the regenerator and containing therein at least one heat transfer tube in heat exchange relationship with catalyst (which may be fluidized) in the cooler, and which heat transfer tube(s) may contain catalyst which is active for dehydrogenating alkane hydrocarbon passed through the tube.

Preferably, the catalyst cooler is connected for the passage of regenerated catalyst directly and/or indirectly to the reactor after passing in heat transfer contact with the said heat transfer tube.

The catalyst cooler may comprise a vessel for containing a bed of catalyst particles at least up to a level above a part of the said heat exchange tube containing dehydrogenation catalyst. Preferably, the catalyst cooler has a distributor for distributing a fluidizing gas into the bed of catalyst particles in order to fluidize the bed in contact with the said part of the heat exchange tube.

The apparatus preferably comprises a conduit for passing gas from the cooler into the regenerator.

Preferably, there are gas-supply means for supplying to the distributor a gas which contains at least one component capable of oxidatively removing deposits from catalyst particles in the bed. The said gas-supply means may comprise an air blower and/or a steam-supplying boiler.

The apparatus may comprise a source of a $C_8$-alkane, e.g. $C_6$-alkane, preferably $C_4$-alkane stream, and means for connecting said alkane stream source to an inlet to the said heat transfer tube. The source of the alkane stream may be the FCCU and fractionation equipment thereof for separating cracked products from the reactor.

The apparatus may comprise means for recovering alkenes from a product stream recovered from an outlet of said heat transfer tube. Such alkene recovery means may comprise fractional distillation equipment and/or adsorption/desorption apparatus and/or refrigeration equipment.

The cooler may be in the form of a shell-and-tube heat exchanger whereof the tubes contain alkane-dehydrogenation catalyst, and are surrounded by, and preferably immersed in, cracking catalyst from the regenerator. In one embodiment, the tubes may be of the hairpin type extending from a tubesheet forming part of an inlet and outlet header.

In another type of embodiment, the apparatus of the invention may comprise a reactivator wherein particles of spent alkane-dehydrogenation catalyst are contacted with an oxygen-containing reactivating gas to remove carbonaceous deposits therefrom in an exothermic oxidation reaction, a first conduit for conducting particles of dehydrogenation catalyst from one end of the tube(s) to the reactivator and a second conduit for conducting reactivated catalyst particles from the reactivator to the other end of the tube(s). Preferably, the reactivator comprises a riser receiving oxygen-containing gas and spent or deactivated catalyst at the bottom, and the tube(s) are arranged to receive reactivated catalyst at the top. Preferably, there is provided separator means connected for receiving and separating reactivated catalyst and used reactivating gas from the riser and for passing separated reactivated catalyst to the tube(s) for use in dehydrogenating further quantities of alkane hydrocarbons.

BRIEF DESCRIPTION OF THE DRAWINGS

The invention is now further described with reference to the accompanying highly diagrammatic drawings, which are given by way of example and for the purpose of exposition, without any intention of limitation, and in which.

In all the drawings and description, only the features of the embodiments which are necessary for an understanding of the invention are depicted. Other features such as pumps and ancillary equipment which would be known and appreciated by a skilled technologist in the field of the invention have been omitted.

Figure 1:
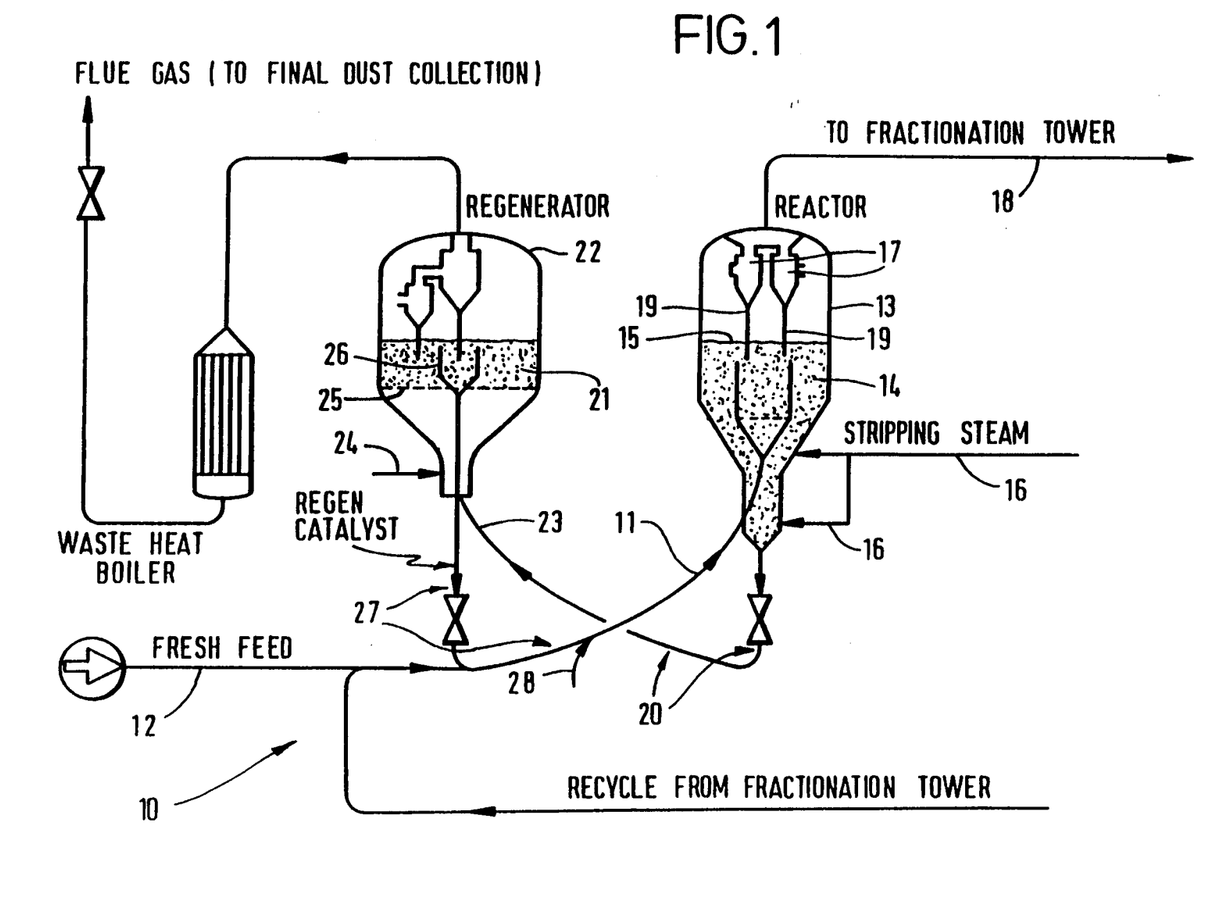
FIG. 1 shows, in diagrammatic form, and not scale, the principal features of a known FCCU.

Reference is first made to FIG. 1, wherein the fluidized catalytic cracker unit (FCCU), generally indicated by reference 10, comprises an upwardly-extending riser-reactor line 11 containing hot regeneration catalyst into a lower pan of which the feed to be catalytically cracked is passed from feed line 12. The riser-reactor line 11 terminates inside a reactor vessel 13, wherein separation of catalyst solids from vapours occurs under the influence of gravity and/or ballistically. The separated solids form a bed 14 having a top level 15, and the bed 14 is fluidized by steam which is passed into a lower region of the vessel 13 from line 16.

Vapours and entrained solids pass into a cyclone separator system 17 which separates at least some of the entrained solids, and vapours having a relatively low solids content are recovered via line 18. Solids separated in the cyclone separator system 17 are passed to the bed 14 via one or more diplegs 19.

The lower part of the vessel 13 is narrower than the upper part, and the countercurrent contacting of downflowing catalyst and upflowing steam in the lower part strips adsorbed and occluded hydrocarbon material from the catalyst.

Stripped catalyst contaminated with carbonaceous material and at a temperature of about 510° C. is recovered from the bottom of the vessel 13 in a line 20 and passed therethrough into a regenerator bed 21 contained in a regenerator vessel 22. The catalyst passes via line 20 into the regenerator vessel 22 under the influence of a lift gas (e.g., air and/or steam) injected into the upwardly extending part 23 of the line 20 beneath the regenerator vessel 22. Catalyst in the regenerator bed 21 is fluidized by air which is passed into the bottom thereof from line 24 and distributed into the base of the bed 21 by a distributor 25. The oxygen of the fluidizing air burns off carbonaceous material from the catalyst particles in the bed, thereby "regenerating" the catalyst and raising its temperature to about 750° C.

Hot regenerated catalyst overflows from the top region of the regenerator bed 21 into a collection duct 26 and is recovered in a generally U-shaped line 27 of which the riser-reactor line 11 forms the upwardly-extending part below the reactor vessel 13. The hot regenerated catalyst passes to the reactor vessel 13 and its circulation may be promoted by passing a lift gas (e.g., steam) into the line 27 at a suitable location beneath the reactor vessel 13, e.g., as indicated by reference 28.

The amount of carbonaceous material deposited on the stripped catalyst particles leaving the vessel 13 depends on a number of factors, of which an important one is the nature of the feed. A so-called "heavy feed" having a high Conradson carbon number and a high content of organometal compounds tends to lead to higher levels of carbonaceous deposit on the stripped catalyst. The regeneration of catalyst having high levels of carbonaceous deposit requires a correspondingly large supply of air via line 24 and causes the production of relatively large quantities of heat. The amount of air that can be supplied to the regenerator bed 21 is fixed by the capacity of the air-supply blower (not shown) and if the carbonaceous deposit requires amounts of air approaching the maximum capacity of the blower, the rate of supply of feed via line 12 to the riser-reactor line 11 may not be increased, and thus the maximum feed throughput of the FCCU 10 may be limited by air-supply blower capacity. Such a limitation on feed throughput can be adversely influential on the operating economics of the FCCU 10.

A consequence of regenerating catalyst having a relatively high level of carbonaceous deposit thereon is the generation of relatively large amounts of heat. The heat can be generated within the regenerator bed 21 and/or in the freeboard above the bed 21 and/or in combustion equipment adapted for burning CO in the flue gas exiting the regenerator vessel. Whichever mode or combination of modes is employed for generating heat, the usual outcome is that the heat will exceed the heat requirement for raising the temperature of the catalyst from the temperature at which catalyst enters the regenerator to the temperature at which the catalyst should first contact the feed. The surplus heat is usually employed to raise steam, but with the increasing use of heavy feeds, the amounts of steam raised at refineries are often in excess of that required at the refinery. Moreover, for practical reasons, the maximum temperature of saturated steam raised in this way is about 275° C., thereby further limiting the scope for disposal of high-level heat from a FCCU. Thus, some of the heat available from the catalyst regeneration step is often wasted because there is no use for it at the refinery. A benefit of the present invention is that it serves to redress some of the adverse factors mentioned above, as will be seen from the description of FIG. 2 which follows.

Figure 2:
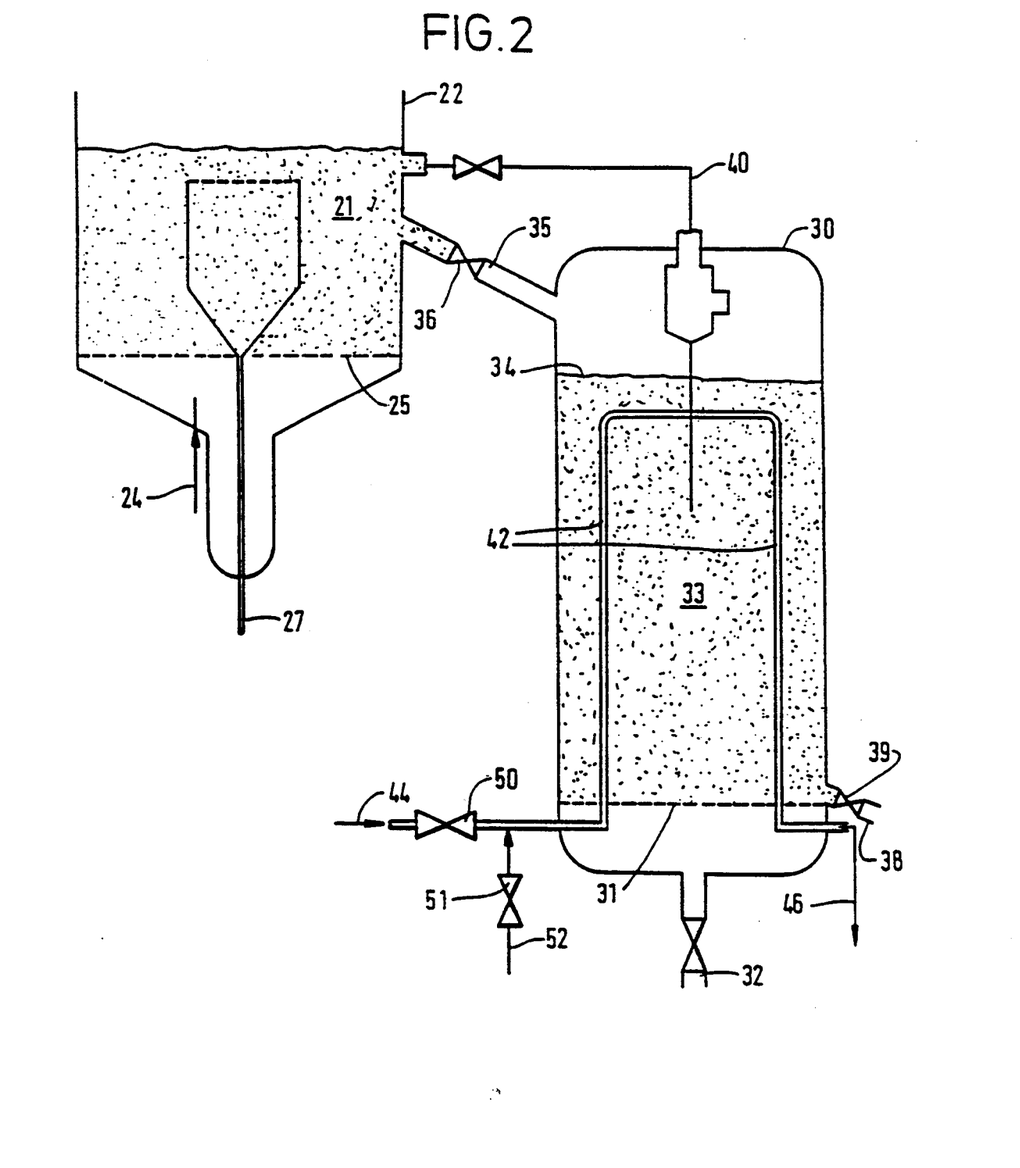
FIG. 2 shows in diagrammatic form, part of an FCCU of the type shown in FIG. 1, but in accordance with the invention.

In FIG. 2, there are depicted (not to scale) part of the regenerator vessel 22, hereinafter referred to as the main regenerator 22, a secondary regenerator vessel 30, and certain items of pipework and conduits. The secondary regenerator vessel 30 is hereinafter termed the secondary regenerator 30, and it should be understood that the latter terminology is used for convenience in this description, since it will be appreciated from the description that the so-called secondary regenerator 30 may be operated within the scope of the present invention without effecting any material regeneration of catalyst therein.

The secondary regenerator 30 contains a gas distributor 31 near its base for supporting a fluidized bed 33 of catalyst thereon. A fluidizing gas is passed into the bottom region of the secondary regenerator 30 from line 32 in order to fluidize the catalyst bed 33 therein. The bed 33 extends up to a level indicated by reference 34, and receives catalyst particles in an upper region of bed 33 from the bed 21 in the main regenerator 22 via downsloping conduit 35. A control valve 36 is located in conduit 35 to regulate the rate of flow of catalyst therethrough.

Catalyst is circulated out of the secondary regenerator 30 from a lower region of bed 33 via a conduit 38 having a control valve 39 therein.

Used fluidizing gas is recovered in line 40 at the top of the secondary regenerator, and may be either discharged directly to atmosphere (after suitable de-dusting treatment) or, as shown in FIG. 2, preferably passed into the bed 21 of the main regenerator.

Heat transfer tubes 42 are immersed in the bed 33 of the secondary regenerator. For simplicity of illustration, a single heat transfer tube 42 is shown in FIG. 2; those skilled in the art will understand and know not only the possible practical arrangements for a single tube 42, but also those for a plurality of tubes 42.

The heat transfer tube 42 is connected to receive an alkane-containing hydrocarbon feed from line 44 and processed hydrocarbon product is discharged from tube 42 via line 46.

The fluidizing gas passed from line 32 into the bed 33 preferably has such properties that it maintains the heat transfer tube 42 at a temperature which is sufficiently high to cause dehydrogenation of at least some of the alkane-containing hydrocarbon feed within the tube 42 to olefins. The hydrocarbon feed may be of a $C_8$-alkane stream, e.g., a $C_6$-alkane stream, but is preferably a $C_5$-alkane stream, more preferably a $C_4$-alkane stream, and still more preferably, a $C_3$-alkane stream. The latter is a common stream at refineries and is often a by-product of catalytic cracking processes. Its commercial value is that of a fuel and is therefore relatively low. The corresponding $C_3$-olefins are relatively much more valuable since they are useful as feedstocks for the chemical industry.

In order to achieve selective dehydrogenation of alkanes to alkenes within the heat transfer tube 42, the tube 42 preferably contains a suitable dehydrogenation catalyst. Suitable catalysts comprise a chromium and/or zinc component dispersed on a porous refractory support such as silica or alumina and silica. The dehydrogenation of alkanes is a highly endothermic process, and is preferably effected at temperatures in the range of from 500° to 850° C., more preferably from 550° to 700° C. The dehydrogenation temperature within the tube 42 is conveniently attained by circulating an oxygen-containing gas into the bed 33 from line 32. A suitable oxygen-containing gas is air which may be modified by the addition of steam and/or enriched with added oxygen. For most dehydrogenation process embodiments of the present invention, the passage via line 32 of unmodified air is adequate for maintaining desired conditions in the bed 33, and the air may or may not be preheated before entering the bed 33. Within the bed 33, the air fluidizes the catalyst particles and burns therefrom carbonaceous material which was previously deposited during the hydrocarbon cracking reactions occurring in the riser-reactor line 11. The operation of the bed 33 is arranged to attain whatever temperature is necessary in the bed to provide alkane-dehydrogenation temperatures within the tube 42. As will be understood and known by those skilled in the art, the bed temperature will depend upon the heat transfer characteristics of the tube walls in contact with particles and gas in the bed 33 on the outside and dehydrogenation catalyst and alkane feed on the inside. Typically, the mean bed temperature should be up to 100° C. higher than the temperature desired within the tube 42, and a mean bed temperature up to 50° C. higher than within the tube 42 may be adequate.

A gas stream containing alkenes and hydrogen is recovered in line 46, and streams containing hydrogen and respective alkenes may be recovered therefrom by known separation techniques, e.g., partial liquefaction and fractional distillation.

The hot, spent waste gas from the bed 33, containing entrained catalyst fines, is recovered in line 40 and circulated into the bed 21 of the main regenerator 22 where it mixes other gases therein.

Catalyst particles recovered via conduit 38 from a lower region of the secondary regenerator may be substantially regenerated, in the sense that the carbonaceous deposit thereon is removed to about the same extent as such deposit is removed from catalyst which is regenerated in the main regenerator 22. The catalyst particles in conduit 38 may therefore be added at a convenient location in line 27 to regenerated catalyst passing to the reactor-riser line 11. If the catalyst particles recovered in conduit 38 are incompletely regenerated, they may be returned to the main regenerator 22 in any convenient manner (e.g., by addition at a convenient location to spent catalyst particles passing to the regenerator via line 23 and/or to the catalyst stripper vessel 13). The various modes of circulating catalyst particles from conduit 38 as described will be understood by those skilled in the art and such persons will know how to implement the various catalyst circulation modes.

During the course of operation of the process of the invention, carbonaceous material deposits within the tube 42, on the catalyst therein. The carbonaceous material reduces the heat transfer rate from the bed 33 to the feed passing through the tube 42 and also reduces the activity and selectivity of dehydrogenation catalyst. It is preferred that the carbonaceous material be removed periodically, and such removal is effected by interrupting the flow of feed via tube 44 by closing valve 50, and thereafter passing through tube 42 from line 52 a suitable agent for removing the carbonaceous deposit. The deposit-removing agent is admitted to tube 42 from line 52 by opening a valve 51 in line 52. A suitable deposit-removing agent is an oxygen-containing gas such as air or a mixture of air and flue gas (e.g., flue gas recycled from the outlet of the main regenerator vessel 22) or steam or a mixture of steam with either air or air and flue gas. The gas products from line 42 during the dehydrogenation catalyst regeneration operation may be discharged to atmosphere after a suitable clean-up treatment. Preferably, they are passed via suitable conduits (not shown) into the freeboard above the bed 21 in the main regenerator vessel 22.

During the operation of removing carbonaceous deposit from the interior of tube 42, the secondary regenerator 30 may be operated in the manner described herein.

When the operation for removing carbonaceous material from the interior of tube 42 is complete, valve 51 is closed and valve 50 is opened and further quantities of alkane feed are dehydrogenated to alkenes in tube 42.

In order to avoid loss of hydrocarbon products, it is preferred to pass an inert purge gas (such as flue gas) through the tube 42 after valve 50 has been closed but before valve 51 is opened, and also after valve 51 has been closed but before valve 50 has been opened. The pipes and valves for regulating the inert purge gas flow are not shown in FIG. 2 as their construction and operation will be clear to those skilled in the art.

For continuity of the production of alkenes, a plurality of tubes 42 are preferably provided. During operation, at least one tube will be receiving alkane feed while another tube may be receiving an agent for removing carbonaceous deposit therefrom.

Figure 3:
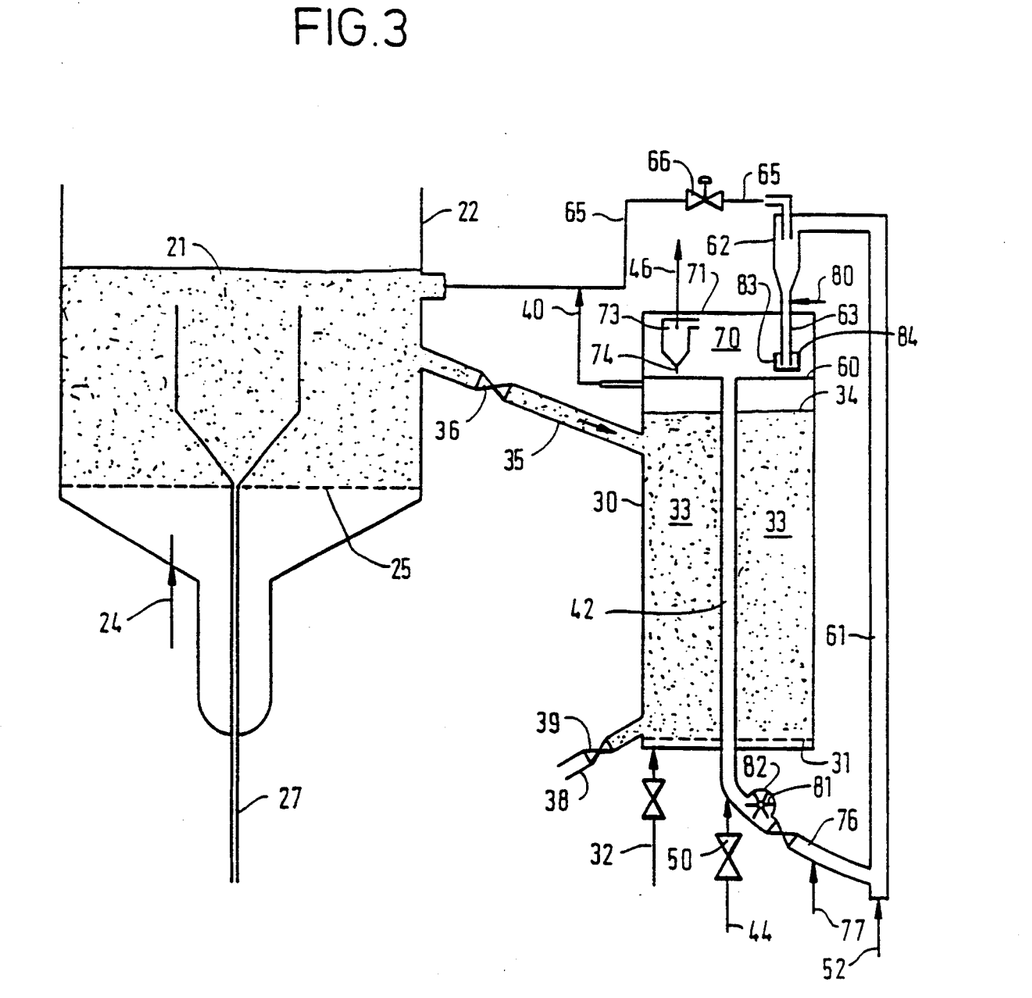
FIG. 3 shows in diagrammatic form part of the FCCU of FIG. 1 but in accordance with another embodiment of the invention.

Reference is now made to the embodiment schematically shown in the diagram of FIG. 3, wherein items in common with FIG. 2 have the same reference numeral.

Hot cracking catalyst is passed via tube 35 and flow control valve 36 from the regenerator bed 21 to the catalyst bed 33 in the secondary regenerator vessel 30. The catalyst bed 33 extends up to a top level 34, and catalyst leaves the lower region of bed 33 via tube 38 and flow-control valve 39 for circulation to the riser-reactor line 11, in the same manner as may be employed for the FIG. 2 embodiment. Regeneration air is passed into the bed 33 from air-line 32, and spent regeneration air leaves the secondary regenerator via line 40 for safe disposal (e.g., into the main regenerator 22, as shown).

The top of the secondary regeneration zone is defined and closed by a baffle 60, and one or more reaction tubes 42 containing dehydrogenation catalyst particles extend downwardly through the bed 33 from their open ends at the baffle 60. The lower end of the (or each) tube 42 is curved to connect to the lower region of a regenerator-riser 61, and the top of the riser 61 is connected to a cyclone separator system 62 for separating solids from gases. Separated solids from the cyclone separator 62 pass down the dipleg 63 and are deposited on the baffle 60 from where they overflow into the reaction tube(s) 42.

In the FIG. 3 embodiment, particles of dehydrogenation catalyst circulate downwardly through the reaction tube(s) 42 in countercurrent to upwardly-passing alkane feedstock supplied from line 44 via a flow-control valve 50.

The particles of dehydrogenation catalyst pass, under the action of gravity, into the lower region of riser 61. Air (or other oxygen-containing gas) is passed into the bottom of riser 61 from line 52, thereby entraining the particles upwardly while subjecting them to oxidizing conditions which remove carbonaceous deposits therefrom. The air-catalyst mixture is separated in cyclone separator system 62, and spent air is recovered via line 65, in which is provided a pressure-regulating valve 66. The spent air may be discharged in any safe manner, e.g. by disposal into the main regenerator 22 (e.g., in conjunction with spent gas from line 40, as shown).

The operation of the FIG. 3 embodiment is broadly as follows:

A fluidized bed 33 of hot cracking catalyst is established in vessel 30. The catalyst may be stripped catalyst from the lower part of the reactor vessel 13 (the stripping section thereof) or from the regenerator bed 21 (as shown) or it may be a mixture from both the stripping section and the regenerator bed 21. The catalyst is fluidized by air from line 32 which is passed into the base of the bed from a suitable distributor 31. The air may be preheated, if necessary, or it may maintain the temperature of the bed 33 by oxidizing carbonaceous material from catalyst particles therein. Spent air is discharged via line 40 to bed 21, and the inventory of catalyst in the bed 33 is maintained by circulating particles out of the bottom region thereof via tube 38.

An alkane-containing gas is passed upwardly into the tube(s) 42 from line 44, and the gas passes countercurrently to particles of dehydrogenation catalyst passed downwardly through the tube(s) 42. The temperature within the tube(s) 42 is in the range for effecting the endothermic dehydrogenation of alkanes (e.g., 600° to 750° C.), and a gas mixture containing dehydrogenated alkanes is recovered in the space 70 between the baffle 60 and the top 71 of the vessel 30. Some separation of gas from entrained particles of dehydrogenation catalyst occurs in the space 70, and further separation is effected by cyclone-separator system 73 through which the gas passes before being discharged into the product-recovery line 46. Separated catalyst particles are returned to the space 70 via a dipleg 74 beneath the system 73.

Active particles of dehydrogenation catalyst are supplied to the tube(s) 42 at an alkane-dehydrogenation temperature from a leg 63 at the base of separator system 62. The particles pass down the tube(s) 42 in countercurrent to the alkane feed-gas, and are recovered (at a reduced temperature) at the bottom of tube(s) 42 in a curved pipe or pipes 76 which conveys them to the lower region of a riser-regenerator 61. The catalyst particles are maintained in a fluidized state by aerating gas (e.g., steam) passed into the curved pipe(s) 76 from one or more lines 77.

Air (or other oxygen-containing gas) injected into the base of the riser 61 from line 52 entrains the catalyst particles upwardly while reactivating them by exothermically oxidizing carbonaceous deposits therefrom, thereby raising their temperature to an alkane-dehydrogenating temperature in the range 500° to 800° C., e.g., 600° to 750° C.

The reactivated heated dehydrogenation catalyst particles are separated from spent air (or other gas) in cyclone separator system 62, and spent air is discharged via line 65 (and pressure regulator 66, if used), preferably to a suitable safe location e.g., to the main regenerator bed 21 and/or to a CO-boiler (not shown) connected to receive and burn CO-containing flue gas from the regenerator. Reactivated catalyst is recirculated for re-use via leg 63 of the cyclone separator 62 to the top of the tube(s) 42. An inert gas is injected from line 80 into the top of the leg 63 to prevent mixing of oxygen-containing gas from the cyclone separator system 62 with alkene-containing product gas from the top of the tube(s) 42.

In order to effect a relatively positive separation in pipe(s) 76 of the alkane-containing feed gas from line 44 and the oxygen-containing gas from line 52, a rotary valve means 81 is provided in pipe(s) 76. The rotary valve means 81 may be of the type known in the art as a 'star valve', and the vanes thereof may be sealingly rotated in their housing 82 either by an externally powered shaft (not shown) and/or by the action of particles passing downwardly in the pipe(s) 76.

A rotary valve means may also be provided at the bottom of the leg 63 in order to prevent mixing of the spent oxygen-containing gas from the cyclone separator system 62 with the gas mixture in the space 70. Alternatively, and as depicted, a catch-pot 83 is disposed at the bottom of the leg 63 to receive catalyst particles therein and thereby form a seal. As catalyst particles pass down the leg 63, a corresponding amount of particles overflows the lip 84 of the catch-pot 83 for circulation into the tube(s) 42.

In the rotary valve means and/or the catch-pot arrangement, an inert gas may be injected as required or if necessary to maintain the flow of catalyst particles.

Although the flow of catalyst particles in the pipe(s) 76 and/or leg 63 may be discontinuous, the flow of catalyst particles in pipe(s) 42 is continuous or substantially continuous.

The FIG. 3 embodiment provides continuous reactivation of the dehydrogenation catalyst particles and thereby avoids the need to interrupt the dehydrogenation process in a tube 42 while catalyst therein is regenerated, as described with reference to FIG. 2. Moreover, heat transfer from bed 33 to the materials in tube(s) 42 is improved due to the absence of fixed catalyst in the tube(s) 42 and the passage of gaseous material in contact with the interior walls of the tube(s) 42.

Figure 4:
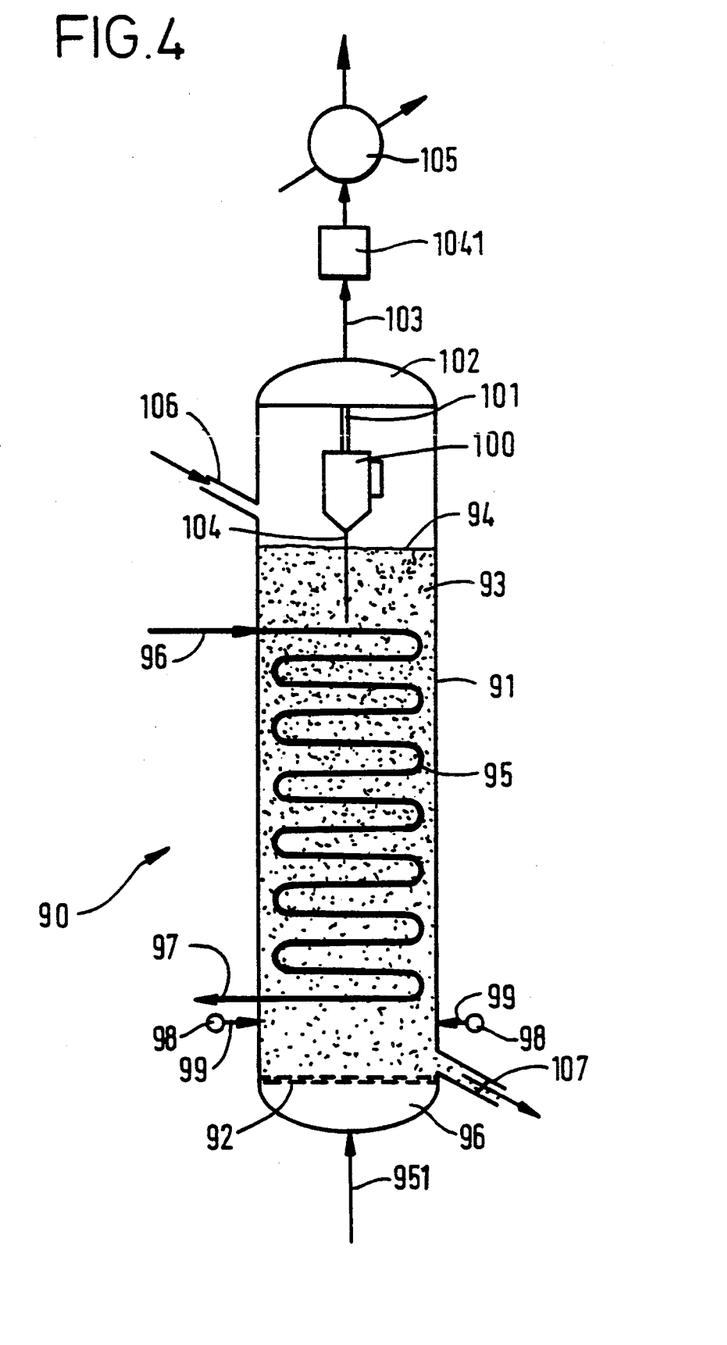
FIG. 4 shows the principal features of a dehydrogenation unit which can be operated either as a substitute for dehydrogenation units shown and described in relation to FIGS. 2 and 3 or as an independent dehydrogenation unit.

Reference is made to the diagrammatic drawing of FIG. 4.

The dehydrogenation unit 90 comprises a vessel 91 having a gas distributor 92 near to its base. The distributor 92 supports a bed 93 of solid particles up to a level 94. A conduit 951 is connected to the base of the vessel 91 to conduct a gas into the space 96 beneath the distributor 92, and the distributor serves to distribute the gas relatively uniformly into the base of the bed 93. The gas is passed into the bed 93 at a rate which is sufficiently high to cause the formation of a so-called well-mixed fluidized bed, as will be appreciated by those skilled in the art. In a well-mixed fluidized bed, the particles in the bed circulate relatively freely between lower and upper regions resulting in the formation of a fluidized bed which is relatively uniform in terms of temperature and physical composition. Temperature uniformity and bed mixing can be impoved by an external and/or an internal particles circulation pipe (not shown), e.g., connecting lines 106 and 107. Erosion of tube 95 would thereby be mitigated.

A dehydrogenation tube 95 is immersed in the bed 93, and the tube is connected to receive an alkane-containing feedstream at a regulated rate via a connection 96. An olefin-containing product stream may be withdrawn from tube 95 via a connection 97. The tube 95 may contain dehydrogenation catalyst, and any of the expedients described herein may be employed to renew the activity of the catalyst when necessary. The tube 95 may have any form, and need not have the form depicted for the purpose of illustration only in FIG. 4. The bed 93 is maintained, during operation, at a suitably elevated temperature to ensure that alkanes are converted to olefins in an economically-acceptable rate and proportion. The elevated temperature in the bed 93 may be maintained by one or more methods, of which the following are examplary: (a) the gas in conduit 951 may be hot gas, e.g. flue gas from another process such as catalytic cracking or it may be air in which a fuel (fuel oil, refinery waste gas, etc.) has been burned; (b) the gas may be air, and a fuel may be passed into the bed 93 and burned partially or fully therein. A combination of (a) and (b) may be employed. FIG. 4 shows an annular fuel manifold 98 from which one or more fuel injector pipes 99 radiate inwardly to inject fuel into the bed 93. Any suitable fuel may be thus injected. The fuel may be burned fully or partially in the bed 93, depending upon the stoichiometric ratio of fuel to air.

Waste gas together with entrained solids leaves the surface 94 of the fluidized bed 93 and passes via a cyclone-separator 100 and outlet pipe 101 and plenum 102 into an outlet conduit 103. Entrained solids separated by the cyclone-separator 100 are returned to the bed 93 via a dipleg 104.

Optionally, the waste gases may be passed through a waste heat boiler 1041 and a feed water heater or economiser 105 before being discharged to atmosphere.

Particles may be added to the bed 93 from a duct 106 at a rate regulated by a suitable device (e.g., a star valve, not shown) to compensate for solids lost from the bed in the discarded waste gas. Solids may be removed from the bed 93 via a duct 107 to maintain the chemical and-/or physical make-up of the bed. For example, the bed 93 may comprise particles of a sulfur-fixing compound such as calcium oxide whereby the burning in the bed of a sulfur-containing fuel results in the formation of a low-sulfur waste gas due to sulfur-fixing within the bed 93. The make-up solids added at 106 contain active calcium oxide, and the solids removed via duct 107 contain compounds of calcium and sulfur, whereby the chemical activity of the bed 93 for sulfur-capture is maintained.

The dehydrogenation unit 90 has been described so far as if it is intended to operate independently of other processes and equipment. However, it is to be understood that it can be used as a catalyst cooler in a fluidized catalytic cracking unit in the same manner as described and/or illustrated with reference to FIGS. 2 and 3. In this instance, the bed 93 will contain particles of cracking catalyst.

Dehydrogenation catalyst is preferably provided in the tubes 95 of the unit 90, and the catalyst may be re-activated from time-to-time either in-situ or in a separate regenerator as described with reference to the embodiments of FIGS. 2 and 3. The actual shape of the tube 95 may be selected according to the type of re-activation procedure. Thus, the tube 95 may be divided into sections which can be isolated from each other, for catalyst reactivation, without interrupting the path therethrough for the passage of the alkane feedstock and dehydrogenation products thereof. The valves and manifolds for such an arrangement are not described herein since they will be apparent to a person skilled in the art.

It will be appreciated from the foregoing that a plurality of novel and useful technical effects are attained by the application of the invention. Among such effects are the following:

- the conversion of a refinery low-value by-product stream (e.g., low molecular weight alkanes) to a stream containing a relatively higher value alkene chemical feedstock;
- the use of a low-cost modification to a FCCU to attain the novel technical effects;
- an increase in the spent catalyst regeneration capability of a FCCU without modifying the FCCU or its principal auxiliary equipment such as the air blower supplying regeneration air to the main regenerator via line 24 (or the mode of operation of the equipment). The source of air in line 32 can be a relatively low-duty air blower since the pressure drop through bed 33 will usually be considerably less than that through the deeper main regenerator bed 21;
- an increase in the throughput capacity of the FCCU as a result of the increased spent catalyst regeneration capacity;
- the production of alkenes from alkanes without any material modification to the catalytic cracking process or operating conditions (e.g., no change to the cracking catalyst is necessary).
- increased thermal efficiency of a FCCU.
- The use of a cracking catalyst cooling system (wherein heat is employed for alkane dehydrogenation) permits a higher carbon burning rate in the FCCU and controls, or can be used to control, the heat balance of the FCCU, thereby providing enhanced flexibility in the operation of the FCCU (e.g., for different feedstocks, catalysts, operating conditions).
- In addition to alkanes-conversion by dehydrogenation, other value-enhancing reactions may be effected for upgraded products by simultaneous processing of the alkane-containing feed sream and higher alkane components or mixtures, the reaction conditions being adjusted if necessary.

One or more features of one embodiment of the invention may be employed in another embodiment without departing from the invention as described and/or claimed.

What is claimed is:

1. A process for dehydrogenating alkanes comprising passing an alkane-containing feedstream through a dehydrogenation zone comprising one or more heat exchange tubes (which may contain alkane-dehydrogenation catalyst), which tubes are immersed in a bed of fluidized particles at an elevated temperature, in the range of 500° to 800° C., the temperature within the heat exchange tube(s) being maintained within said temperature range by heat-transfer from the fluidized bed, recovering an olefin-containing product stream from the dehydrogenation zone, and maintaining the elevated temperature of the bed of fluidized particles by an exothermic oxidation reaction with the bed.

2. The process of claim 1 wherein the passage of the feedstream through the or each tube of the dehydrogenation zone is periodically interrupted, and an oxygen-containing gas is passed into the or each tube during the said interruption and employed to remove carbonaceous deposits from the interior of the or each tube (and from any dehydrogenation catalyst therein).

3. The process of claim 2 wherein gas recovered from the or each tube during each interruption is passed into the regeneration zone.

4. The process of claim 1 wherein particles of dehydrogenation catalyst are circulated through the tube(s) in contact with the feedstream, catalyst particles are separately recovered from dehydrogenated alkanes and contacted with an oxygen-containing gas to remove carbonaceous deposits therefrom by exothermic oxidation thereof, and the thus re-activated and heated dehydrogenation catalyst particles are recirculated to the tube(s) for contact with further quantities of the alkane-containing feedstream.

5. The process of claim 4 wherein the catalyst particles and feedstream pass through the tube(s) countercurrently, and an olefin-containing product stream is recovered from one end of the tube(s) and deactivated catalyst is recovered from the other end of the tube(s).

6. The process of claim 4 wherein deactivated catalyst is entrained with the oxygen-containing gas, and after separation of reactivated catalyst, spent oxygen-containing gas is circulated to the said regeneration zone and/or to a CO-boiler.

7. An integrated combination process for the simultaneous production of olefins and catalytically cracked hydrocarbon products (CCHP) employing the process of claim 1 comprising the steps of passing a hydrocarbon feedstock to the reaction zone of a catalytic cracking unit (CCU) wherein the feedstock is contacted with active cracking catalyst under catalytic cracking conditions and converted to CCHP, and the cracking catalyst is at least partially deactivated by coke and hydrocarbonaceous material deposited thereon, separating the CCHP and deactivated cracking catalyst, recovering the CCHP, subjecting the deactivated cracking catalyst to a stripping step in a stripping zone to remove at least some of the hydrocarbonaceous material therefrom, subjecting the stripped, deactivated catalyst to a regeneration step in a regeneration zone wherein at least some of the coke and remaining hydrocarbonaceous material is removed by exothermic oxidation which raises the catalyst temperature, passing regenerated and heated catalyst from the regeneration zone to the reaction zone for the catalytic cracking of further quantities of hydrocarbon feedstock, and employing particles of cracking catalyst circulating in the CCU as the particles of the said fluidized bed of the dehydrogenation zone by passing through the fluidized bed cracking catalyst particles circulating to and/or from the regenerator.

8. The process of claim 7 wherein the passage of the feedstream through the or each tube of the dehydrogenation zone is periodically interrupted, and an oxygen-containing gas (e.g. air) is passed into the or each tube during the said interruption and employed to remove carbonaceous deposits from the interior of the or each tube (and from any dehydrogenation catalyst therein).

9. The process of claim 8 wherein gas recovered from the or each tube during each interruption is passed into the regeneration zone.

10. The process of claim 7 wherein particles of dehydrogenation catalyst are circulated through the tube(s) in contact with the feedstream, catalyst particles are separately recovered from dehydrogenated alkanes and contacted with an oxygen-containing gas to remove carbonaceous deposits therefrom by exothermic oxidation thereof, and the thus re-activated and heated dehydrogenation catalyst particles are recirculated to the tube(s) for contact with further quantities of the alkane-containing feedstream.

11. The process of claim 10 wherein the catalyst particles and feedstream pass through the tube(s) countercurrently, and an olefin-containing product stream is recovered from one end of the tube(s) and deactivated catalyst is recovered from the other end of the tube(s).

12. The process of claim 10 wherein deactivated catalyst is entrained with the oxygen-containing gas, and after separation of reactivated catalyst, spent oxygen-containing gas is circulated to the said regeneration zone and/or to a CO-boiler.

* * * * *